US007623869B2

(12) United States Patent
Lee et al.

(10) Patent No.: US 7,623,869 B2
(45) Date of Patent: Nov. 24, 2009

(54) RADIO COMMUNICATION SYSTEM AND METHOD

(75) Inventors: Young Dae Lee, Kyoungki-do (KR); Seung June Yi, Seoul (KR); Sung Duck Chun, Anyang (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 11/029,737

(22) Filed: Jan. 4, 2005

(65) Prior Publication Data

US 2005/0192021 A1 Sep. 1, 2005

(30) Foreign Application Priority Data

Jan. 9, 2004 (KR) ............ 10-2004-0001726

(51) Int. Cl.
*H04W 72/00* (2006.01)
(52) U.S. Cl. .............. 455/452.2; 455/422.1; 455/452.1; 370/444
(58) Field of Classification Search .............. 455/452.2, 455/452.1, 422.1, 432.1, 435.1, 433, 432.3; 370/444
See application file for complete search history.

(56) References Cited

U.S. PATENT DOCUMENTS

| | | | |
|---|---|---|---|
| 6,222,841 B1* | 4/2001 | Taniguchi | .................. 370/389 |
| 2003/0104801 A1* | 6/2003 | Koulakiotis et al. | ........ 455/406 |
| 2003/0134653 A1 | 7/2003 | Sarkkinen et al. | |
| 2004/0102212 A1 | 5/2004 | Sarkkinen et al. | |
| 2004/0131026 A1* | 7/2004 | Kim et al. | .................. 370/328 |
| 2004/0157603 A1 | 8/2004 | Hurtta et al. | |
| 2005/0070277 A1* | 3/2005 | Hu | ......................... 455/432.3 |
| 2005/0147127 A1* | 7/2005 | Putcha et al. | ............... 370/480 |

FOREIGN PATENT DOCUMENTS

| | | |
|---|---|---|
| EP | 1 460 791 A3 | 11/2004 |
| JP | 2000-278735 | 10/2000 |
| JP | 2003-69491 | 7/2003 |
| KR | 2003-0089340 A | 11/2003 |

(Continued)

OTHER PUBLICATIONS

Banboo Media Casting LTD: "MBMS User Service Priorities" 3GPP TSG SA WG1 #22, Oct. 27, 2003, p. 1, XP002275093 * the whole document*.

(Continued)

*Primary Examiner*—George Eng
*Assistant Examiner*—Muthuswamy G Manoharan
(74) *Attorney, Agent, or Firm*—Lee, Hong, Degerman, Kang & Waimey (57) ABSTRACT

A method for receiving a service in a mobile terminal from a network in a wireless communication system, the method comprising establishing a first radio bearer and receiving a first service associated with the first radio bearer and receiving second radio bearer setup information from the network to establish a second radio bearer for receiving a second service associated with the second radio bearer. The mobile terminal prioritizes between the first service associated with the first radio bearer and the second service associated with the second radio bearer and determines whether the mobile terminal is able to receive a higher prioritized service if the second radio bearer is established. Furthermore, the mobile terminal retains the higher prioritized service.

20 Claims, 5 Drawing Sheets

FOREIGN PATENT DOCUMENTS

| RU | 96102137 | 4/1998 |
|---|---|---|
| RU | 2157598 | 10/2000 |
| RU | 2192095 | 10/2002 |
| WO | WO 99/52307 | 10/1999 |
| WO | WO 01/11910 A1 | 2/2001 |
| WO | WO 02/19619 A2 | 3/2002 |
| WO | 03/015440 | 2/2003 |
| WO | WO 03/015440 A1 | 2/2003 |

OTHER PUBLICATIONS

3GPP Group Services and System Aspects: "3GPP TS 23.246 V.2.0.0: Multimedia Broadcast/Multicast Service (MBMS); Architecture and Functional Description (Release 6)" 3GPP TS 23.236 V2..0.0, Sep. 2003, page complete, XP002310393 *paragraph [08.1]-paragraph [08.5].

Ashok Kumar: "UTRAN architecture for Multimedia Broadcast Multicast Service (MBMS)" International Conference on Communication and Broadband Networking, May 5, 2003, pp. 1-7, XP002263989 *p. 1, right-hand column, line 1-line 21* *p. 4, right-hand column, line 4-line 45*.

3GPP "Multimedia Broadcast/Multicast Service, Architecture and Functional Description" 3GPP TR 23.846 1.1.1, Jan. 2002.

Federal Service for Intellectual Property, Patents and Trademarks (Rospatent), "Decision on Granting a Patent for Invention," App. No. 2006120677/09(022466), Form No. 01 H3-2008, Jan. 20, 2009.

* cited by examiner

RADIO COMMUNICATION SYSTEM AND METHOD

CROSS-REFERENCE TO RELATED APPLICATIONS

Pursuant to 35 U.S.C. § 119(a), this application claims the benefit of earlier filing date and right of priority to Korean Application No. 2004-0001726, filed on Jan. 9, 2004, the contents of which is hereby incorporated by reference herein in its entirety.

BACKGROUND OF THE INVENTION

1. Field of the Invention

The present invention relates to a radio communication system, and more particularly, to a radio communication system and method for transmitting and receiving a multimedia broadcast/multicast service.

2. Description of the Related Art

Radio communication systems have remarkably improved; however, when providing communication services dealing with a large capacity of data, radio systems have not provided the same functions provided by wired communication systems. Accordingly, countries around the world are developing technologies, such as IMT-2000, a wireless communication system enabling a large capacity of data communication. Cooperation between many countries is currently progressing to create a specification for the technology.

A universal mobile telecommunications system (UMTS) is a third generation mobile communication system evolving from the Global System for Mobile Communications (GSM) system, which is the European standard. The UMTS is aimed at providing enhanced mobile communications services based a GSM core network and Wideband Code Division Multiple Access (W-CDMA) technologies.

In December 1998, ETSI of Europe, ARIB/TTC of Japan, T1 of the United States of America, and TTA of Korea formed a Third Generation Partnership Project (3GPP) for the purpose of creating a specification for standardizing the UMTS. The work towards standardizing the UMTS performed by the 3GPP has resulted in the formation of five technical specification groups (TSGs), each of which is directed to forming network elements having independent operations.

Each TSG develops, approves, and manages a specification in a related region. Among them, a radio access network (RAN) group (TSG-RAN) develops a specification for the function, items desired, and interface of a UMTS terrestrial radio access network (UTRAN), which is a new RAN for supporting a W-CDMA access technology in the UMTS.

Figure 1:
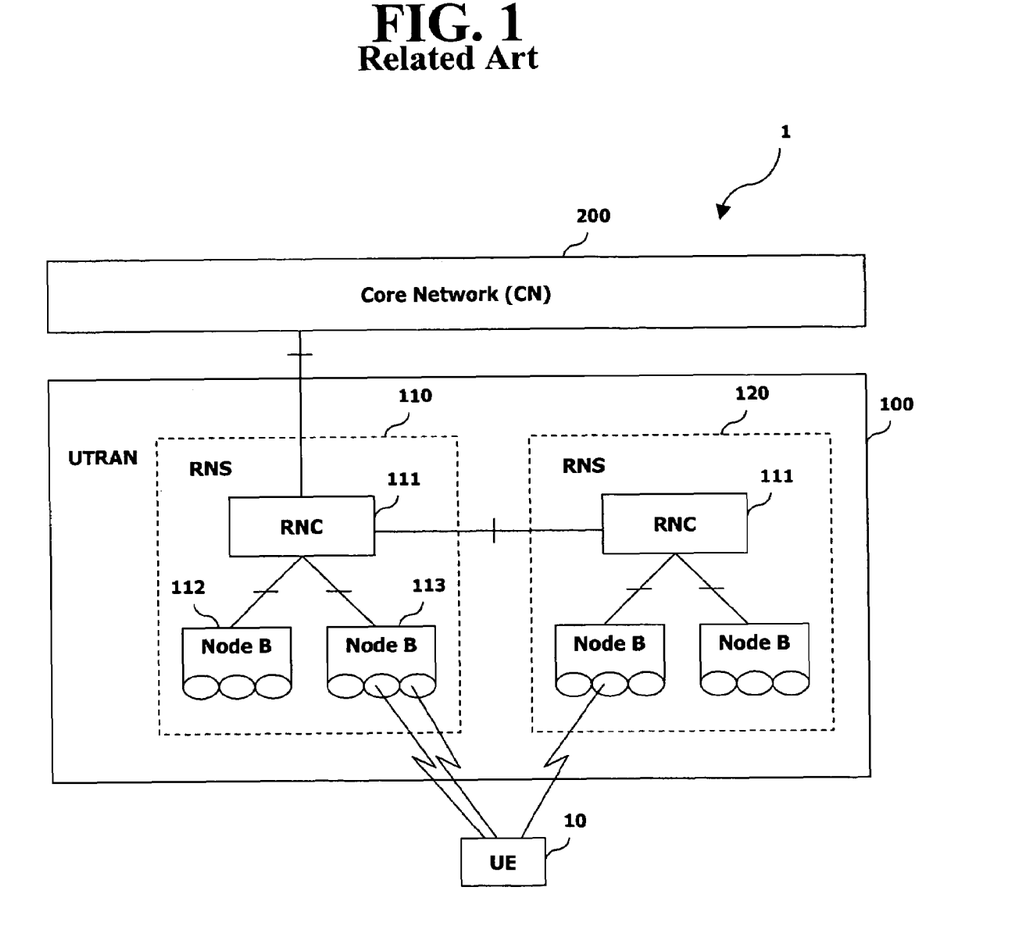
FIG. 1 illustrates a block diagram of a related art UMTS network structure.

Referring to FIG. 1, a related art UMTS network 1 structure is shown. The UMTS broadly comprises a user equipment (UE or terminal) 10, a UMTS Terrestrial Radio Access Network (UTRAN) 100, and a core network (CN) 200. The UE 10 is connected to the core network 200 through the UTRAN 100. The UTRAN 100 configures, maintains, and manages a radio access bearer for communications between the UE 10 and the core network 200 to meet end-to-end quality-of-service requirements.

The UTRAN comprises a plurality of radio network subsystems (RNS) 110, 120, each of which comprises one radio network controller (RNC) 111 for a plurality of base stations, or Node Bs 112, 113. The RNC 111 connected to a given Node B 112, 113 is the controlling RNC for allocating and managing the common resources provided for any number of UEs 10 operating in one cell. The controlling RNC 111 controls traffic load, cell congestion, and the acceptance of new radio links. Each Node B 112, 113 may receive an uplink signal from a UE 10 and may transmit a downlink signals to the UE. Each Node B 112, 113 serves as an access point enabling a UE 10 to connect to the UTRAN 100, while an RNC 111 serves as access point for connecting the corresponding Node Bs to the core network 200.

Figure 2:
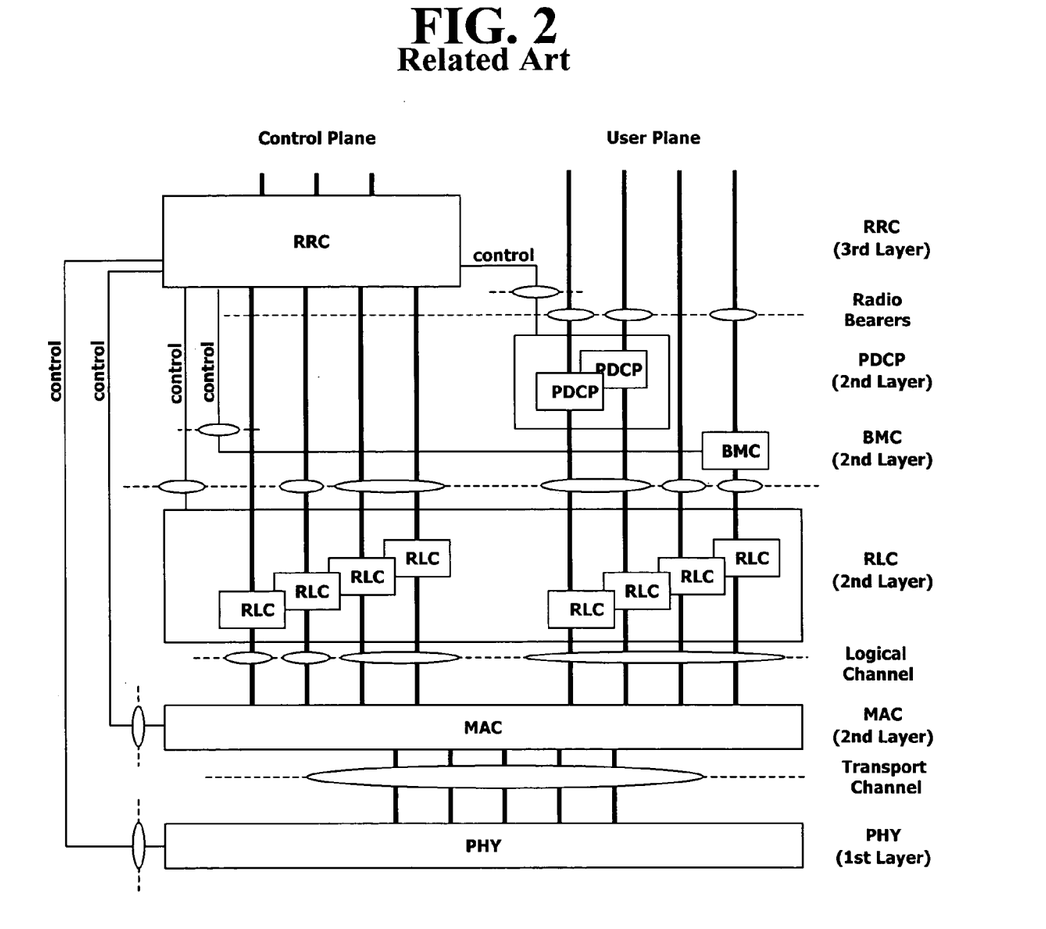
FIG. 2 illustrates a block diagram of the architecture of a related art radio interface protocol based on 3GPP radio access network specifications.

The interface between the UE 10 and the UTRAN 100 is realized through a radio interface protocol established in accordance with 3GPP radio access network specifications. Referring to FIG. 2, a related art radio interface protocol structure used in the UMTS is shown. The radio interface protocol is divided horizontally into a physical layer, a data link layer, and a network layer, and is divided vertically into a user plane for data transmissions and a control plane for transfer of control signaling. The user plane is the region in which user traffic information, such as voice signals and IP (Internet Protocol) packets is transferred. The control plane is the region for carrying control information for the maintenance and management of the interface. In FIG. 2, protocol layers may be divided into a first layer (L1), a second layer (L2), and a third layer (L3) based on the lower three layers of an open system interconnection (OSI) model that is a well-known in the art.

The first layer (L1) is a physical layer (PHY) providing information transfer service to a higher layer using various radio transmission techniques. The physical layer is linked to a medium access control (MAC) layer located above it. Data travels between the MAC layer and the PHY layer via a transport channel.

The second layer (L2) comprises the MAC layer, a radio link control (RLC) layer, a broadcast/multicast control (BMC) layer and a packet data convergence protocol (PDCP) layer. The MAC layer of the second layer (L2) provides assignment service of a MAC parameter for assigning and re-assigning a radio resource. It is connected to an upper layer, i.e., the radio link control (RLC) layer by a logical channel. Various logical channels may be provided according to the type information transmitted. Generally, when control plane information is transmitted, a control channel is used. When user plane information is transmitted, a traffic channel is used.

The RLC layer of the second layer (L2) supports the transmission of reliable data and is responsible for the segmentation and concatenation of RLC service data units (SDUs) delivered from a higher layer. The size of the RLC SDU is adjusted for the processing capacity in the RLC layer and a header is appended to form an RLC protocol data unit (PDU) for delivery to the MAC layer.

The formed units of service data and protocol data delivered from the higher layer are stored in an RLC buffer of the RLC layer. The RLC services are used by service-specific protocol layers on the user plane, namely a broadcast/multicast control (BMC) protocol and a packet data convergence protocol (PDCP), and are used by a radio resource control (RRC) layer for signaling transport on the control plane.

The broadcast multicast control (BMC) layer schedules a cell broadcast (CB) message delivered from the core network 200 and enables the cell broadcast message to be broadcast to the corresponding UEs 10 in the appropriate cell. Header information, such as a message identification, a serial number, and a coding scheme, is added to the cell broadcast message to generate a broadcast/multicast control message for delivery to the RLC layer.

The RLC layer appends RLC header information and transmits the thus-formed message to the MAC layer via a common traffic channel (CTCH) as a logical channel. The MAC layer maps the CTCH to a forward access channel (FACH) as a transport channel. The transport channel is mapped to a secondary common control physical channel (SCCPCH) as a physical channel.

The packet data convergence protocol (PDCP) layer serves to transfer data efficiently over a radio interface having a relatively small bandwidth. The PDCP layer uses a network protocol such as IPv4 or IPv6 and a header compression technique for eliminating unnecessary control information utilized in a wire network. The PDCP layer enhances transmission efficiency since only the information essential to the header is included in the transfer.

The radio resource control (RRC) layer handles the control plane signaling of the network layer (L3) between the UEs 10 and the UTRAN 100 and controls the transport and physical channels for the establishment, reconfiguration, and release of radio bearers. A radio bearer (RB) is a service provided by a lower layer, such as the RLC layer or the MAC layer, for data transfer between the UE 10 and the UTRAN 100.

Establishment of an RB determines the regulating characteristics of the protocol layer and channel needed to provide a specific service, thereby establishing the parameters and operational methods of the service. When a connection is established to allow transmission between an RRC layer of a specific UE 10 and an RRC layer of the UTRAN 100, the UE 10 is said to be in the RRC-connected state. Without such connection, the UE 10 is in an idle state.

For reference, the RLC layer can be included in the user plane or the control plane according to a layer connected above it. For example, when the RLC layer is part of the control plane, data is received from the RRC layer. In other cases, the RLC layer is part of the user plane.

A particular radio bearer used for exchanging an RRC message or an NAS message between a terminal and the UTRAN 100 is referred to as a signaling radio bearer (SRB). When the SRB is set up between a particular terminal and the UTRAN 100, there can exist an RRC connection between the terminal and the UTRAN 100. The terminal which forms the RRC connection is said to be in the RRC connected mode (or state), and the terminal which does not form the RRC connection is said to be in the idle mode (or state). If the terminal is in the RRC connected mode, the RNC checks and manages a location of the corresponding terminal according to a cell unit. When the terminal gets into the RRC connected mode, the RNC sends a signaling message to the UTRAN 100. The terminal in the RRC connected mode may be further divided into a CELL_DCH mode, a CELL_PCH mode, a URA_PCH mode and a CELL_FACH mode.

For those UEs in the idle state, URA_PCH mode, or CELL_PCH mode, a discontinuous reception (DRX) method is employed to minimize power consumption. In the DRX method, a Secondary Common Control Physical Channel (SCCPCH), onto which a Paging Indicator Channel (PICH) and a Paging Channel (PCH) is mapped, is discontinuously received by the UE 10. During the time periods when the PICH or the SCCPCH is not received, the UE is in a sleep mode state. The UE wakes up at every DRX cycle length (discontinuous receiving period length) to receive a paging indicator (PI) of the PICH.

The terminal in the RRC connected mode may additionally form a signaling connection with the core network 200. This signaling connection refers to a path for exchanging a control message between the terminal and the core network 200. The RRC connected mode refers to a connection between the terminal and the UTRAN 100. Accordingly, the terminal informs the core network 200 of its location or requests a particular service using the signaling connection. To obtain the signaling connection, the terminal should be in the RRC connected mode.

Hereafter, Multimedia Broadcast/Multicast Service (MBMS or MBMS service) will be described. MBMS refers to a method of providing streaming or background services to a plurality of UEs 10 using a downlink-dedicated MBMS radio bearer. The MBMS radio bearer may utilize both point-to-multipoint and point-to-point radio bearer services.

As the name implies, an MBMS may be carried out in a broadcast mode or a multicast mode. The broadcast mode is transmitting multimedia data to all UEs within a broadcast area, for example the domain where the broadcast area is available. The multicast mode is for transmitting multimedia data to a specific UE group within a multicast area, for example the domain where the multicast service is available.

Figure 3:
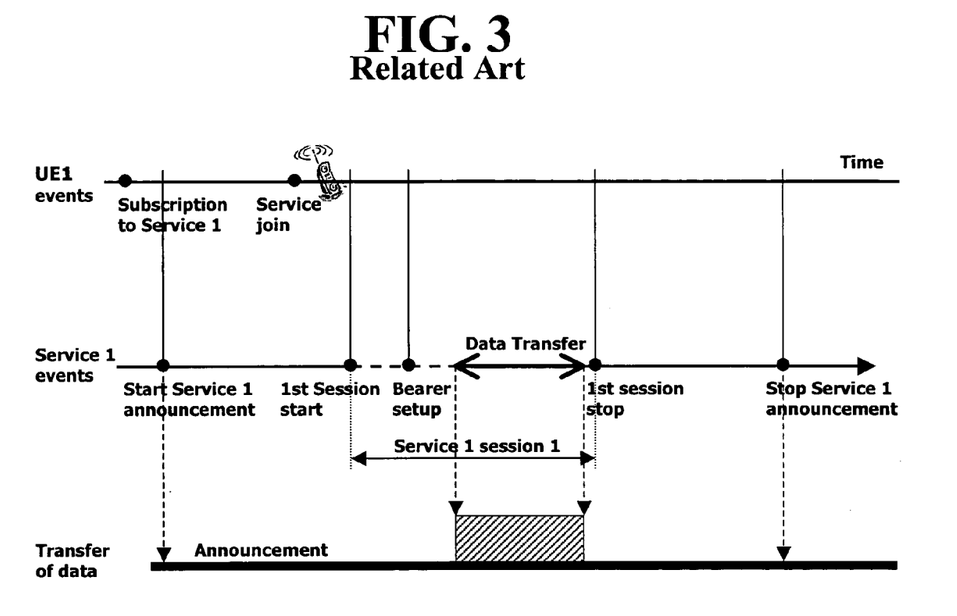
FIG. 3 is a related art diagram showing MBMS service procedures in the multicast mode.

FIG. 3 is a diagram showing procedures of the MBMS service in the multicast mode. Here, the UMTS network is shown providing a specific MBMS service (a first service) using the multicast mode. A terminal (UE1) is also shown receiving the specific service (the first service).

When the UMTS network 1 provides a specific MBMS using the multicast mode, UEs 10 to be provided with the service must first complete a subscription procedure establishing a relationship between a service provider and each UE individually. Thereafter, the subscriber UE 10 receives a service announcement from the core network 200 confirming subscription and including, for example, a list of services to be provided.

The subscriber UE 10 must "join," or participate in, a multicast group of UEs receiving the specific MBMS, thereby notifying the core network 200 of its intention to receive the service. Terminating participation in the service is called "leaving." The subscription, joining, and leaving operations may be performed by each UE 10 at any time prior to, during, or after the data transfer.

While a specific MBMS is in progress, on or more service sessions may sequentially take place, and the core network 200 informs the RNC 111 of a session start when data is generated by an MBMS data source and informs the RNC of a session stop when the data transfer is aborted. Therefore, a data transfer for the specific MBMS may be performed for the time between the session start and the session stop, during which time only participating UEs 10 can receive the data.

To achieve successful data transfer, the UTRAN 100 receives a notification of the session start from the core network 200 and transmits an MBMS notification to the participating UEs 10 in a prescribed cell to indicate that the data transfer is imminent. The UTRAN 100 uses the MBMS notification to count the number of participating UEs 10 within the prescribed cell. Specifically, the UTRAN 100 can perform a function which counts the number of terminals which expect to receive the specific MBMS service within a specific cell.

Through the counting process, it is determined whether the radio bearer providing the specific MBMS service is one for a point-to-multipoint transmission or a point-to-point transmission, or if the radio bearer is not to be set. To select the MBMS radio bearer (RB) for a specific service, the UTRAN 100 sets a threshold value corresponding to the UE 10 count, whereby a low UE count establishes a point-to-point MBMS radio bearer and a high UE count establishes a point-to-multipoint MBMS radio bearer.

The radio bearer established is based on whether the participating UEs 10 need to be in the RRC-connected state. When a point-to-point RB is established, all of the participating UEs 10 which expect to receive the service are in the RRC connected state. When a point-to-multipoint RB is established, it is unnecessary for all of the participating UEs 10 which expect to receive the service to be in the RRC connected mode since the point-to-multipoint RB enables reception by UEs in the idle state. Furthermore, based on the counted result, if no terminal wishes to receive the specific MBMS service, the UTRAN 100 does not establish any radio bearer and the MBMS service data is not transmitted. Thus, radio resources may be wasted by establishing the radio bearer even though no terminal desires the service. Also, the UTRAN 100 transmits the MBMS service data received from the core network 200 during one session of the MBMS service using the established radio bearer.

In the counting process, the UTRAN 100 has no information on terminals in the RRC idle state. Therefore, if the UTRAN 100 requests a counting of terminals in the RRC idle state, subscribed to a specific MBMS service, the terminals should form the RRC connection with the UTRAN 100 and inform the UTRAN 100 that they would receive the specific MBMS service.

However, if a terminal has formed a signaling connection with a Serving GPRS Support Node (SGSN), the SGSN informs the UTRAN 100 of MBMS related information of the terminal. The information includes a list of MBMS services the terminal has subscribed to. Therefore, because the UTRAN 100 can recognize whether terminals have subscribed to a specific MBMS service, the terminals do not respond to the counting request of the UTRAN 100. Furthermore, terminals which have not formed a signaling connection with the SGSN, but are in the RRC connected state, can inform the UTRAN 100 of the MBMS services they have subscribed to when forming the RRC connection with the UTRAN 100. Accordingly, the UTRAN 100 can count the number of terminals desiring to receive the specific MBMS service without any response sent by the terminals in the RRC connected state.

The UTRAN 100 can perform the counting process not only at the beginning of the MBMS service but also in the middle of one session of the MBMS service. This is necessary since the number of terminals expecting to receive the MBMS service in a cell is variable because of events such as a terminal moving to another cell during the MBMS session in process, turning off power, or stopping the subscription of the MBMS service. Accordingly, in order to establish the radio bearer efficiently, the UTRAN 100 can perform the counting process during the MBMS session in process.

However, in this counting process, the following problems may occur when counting the number of terminals desiring to receive the MBMS service and establishing the radio bearer. A terminal is able to get information related to several MBMS services through the MBMS service announcement so that it may subscribe to a plurality of MBMS services. If the terminal stays in the RRC connected state, the UTRAN 100 can recognize all the MBMS services the terminal has subscribed to. Thus, when the UTRAN 100 performs the counting process for a certain MBMS service, a terminal in the RRC connected state and subscribed to the corresponding MBMS service, is added in the number of terminals desiring the MBMS service to be provided.

When the terminal simultaneously receives services it has subscribed to, an event may occur when several services among the subscribed services may not be received due to the terminal's limited capability. For example, a terminal having subscribed to two MBMS services has one SCCPCH through which the MBMS services can be received. If each MBMS service is transmitted through different SCCPCHs, respectively, using the point-to-multipoint RB in a cell, the terminal can receive only one of the subscribed MBMS services due to its limited capability. However, the UTRAN 100 is unable to recognize that the terminal can not receive one of the MBMS services. As a result, the UTRAN 100 performs the counting process and wrongfully considers the terminal as receiving all two MBMS services it has subscribed to. The UTRAN 100 then establishes a radio bearer based on this information.

The error occurring during the counting process causes radio resources to be wasted. As a further example, it is assumed that six terminals are in a cell, and all six terminals have subscribed to an MBMS service A and an MBMS service B. Moreover, all six terminals are in the RRC connected state and can receive services through one SCCPCH. It is also assumed that a threshold value for establishing a point-to-multipoint RB is set at 3. The MBMS service A is being transmitted through the point-to-multipoint RB in a cell and the UTRAN 100 has received a session start notification for the MBMS service B from the core network 200. In this case, the UTRAN 100 may determine there are six terminals which expect to receive the MBMS service B and thus establish the point-to-multipoint RB.

However, if an SCCPCH different from an SCCPCH used for transmitting the MBMS service A is used for transmitting the MBMS service B, then the six terminals may receive only one of the MBMS services A and B due to the their limited capabilities. Thus, either the MBMS service A or the MBMS service B is received according to a user's selection. A situation may occur where five terminals determine to receive the MBMS service A and one terminal determines to receive the MBMS service B. Accordingly, since there is only one terminal desiring to receive the MBMS service B, the UTRAN 100 should establish the point-to-point RB because the number terminals desiring the MBMS service B is below the threshold value of 3. However, the related art UTRAN 100 establishes the point-to-multipoint RB with respect to the MBMS service B because it wrongfully counts all six terminals for receiving the service B. The error occurs because the UTRAN 100 has no information regarding the capabilities of the terminals, service selection of the user, or the like. Unfortunately, the resources required for establishing the point-to-multipoint RB corresponds to several times that of the point-to-point RB. As a result, due to the error occurring during the counting process in the related art, radio resources are wasted and the number of services to be simultaneously provided in one cell is limited.

SUMMARY OF THE INVENTION

The present invention relates to a method and system for transmitting and receiving a service in a wireless communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method and a system. In a preferred embodiment of the invention, a method for receiving a service in a mobile terminal from a network in a wireless communication system comprises establishing a first radio bearer and receiving a service associated with the first radio bearer, receiving second radio bearer setup information from the network to establish a second radio bearer for receiving a service associated with the second radio bearer, prioritizing between the service associated with the first radio bearer and the service associated with the second radio bearer, determining whether the mobile terminal is able to receive a higher prioritized service if the second radio bearer is established, and retaining the higher prioritized service.

The mobile terminal is in an RRC connected mode. The first radio bearer is a point-to-multipoint radio bearer and the second radio bearer is a point-to-point radio bearer. Alternatively, the first radio bearer is a point-to-point radio bearer and the second radio bearer is a point-to-multipoint radio bearer.

In a detailed aspect, retaining the higher prioritized service comprises rejecting the establishment of the second radio bearer. In another aspect, retaining the higher prioritized service comprises requesting release of a lower prioritized service to the network. The method further comprises informing the network of the higher priority service.

In another aspect, the method comprises informing the network of a service the mobile terminal is able to receive. Alternatively, the method comprises informing the network of a service the mobile terminal is unable to receive.

In a further aspect, the method comprises transmitting priority information to a UTRAN. The method may also comprise transmitting priority information to a core network.

In another embodiment of the invention, a method for transmitting a service from a network to a mobile terminal in a wireless communication system comprises establishing a first radio bearer and transmitting a service associated with the first radio bearer, transmitting second radio bearer setup information to the mobile terminal to establish a second radio bearer for transmitting a service associated with the second radio bearer, receiving from the mobile terminal priority information regarding a higher prioritized service between the service associated with the first radio bearer and the service associated with the second radio bearer, and transmitting the higher prioritized service according to the priority information received from the mobile terminal.

The mobile terminal is in an RRC connected mode. The first radio bearer is a point-to-multipoint radio bearer and the second radio bearer is a point-to-point radio bearer. Alternatively, the first radio bearer is a point-to-point radio bearer and the second radio bearer is a point-to-multipoint radio bearer.

In a detailed aspect, the priority information comprises information rejecting the establishment of the second radio bearer. In another aspect, the priority information comprises information requesting release of a lower prioritized service. The method may further comprise performing a counting process for the service associated with the second radio bearer.

In another aspect, the method comprises receiving information of a service the mobile terminal is able to receive. Alternatively, the method comprises receiving information of a service the mobile terminal is unable to receive. In a further aspect, the priority information is received by a UTRAN. Otherwise, the priority information may be received by a core network.

In another embodiment of the invention, a method for receiving a service in a wireless communication system comprises establishing a first radio bearer and receiving a first service associated with the first radio bearer receiving second radio bearer setup information from a network to establish a second radio bearer for receiving a second service associated with the second radio bearer, determining whether a mobile terminal can receive both the first service and the second service, determining which service to receive if the mobile terminal cannot receive both the first service and the second service, and informing the network of a service the mobile terminal expects to receive based on the service determined to be received.

In one aspect, determining whether the mobile terminal can receive both the first service and the second service comprises comparing the second radio bearer setup information with first radio bearer setup information. Furthermore, determining whether the mobile terminal can receive both the first service and the second service may also comprise comparing the second radio bearer setup information with the mobile terminal's receiving capability.

In another aspect, a UTRAN performs a counting process for the second service associated with the second radio bearer based on information received from the mobile terminal.

In another embodiment of the invention, a method for receiving a service in a wireless communication system comprises establishing a first radio bearer and receiving a first service associated with the first radio bearer, receiving second radio bearer setup information from a network to establish a second radio bearer for receiving a second service associated with the second radio bearer, determining whether a mobile terminal can receive both the first service and the second service, determining which service to receive if the mobile terminal cannot receive both the first service and the second service, and informing the network of a service the mobile terminal is not able to receive based on the service determined to be received.

In one aspect, determining whether the mobile terminal can receive both the first service and the second service comprises comparing the second radio bearer setup information with first radio bearer setup information. Furthermore, determining whether the mobile terminal can receive both the first service and the second service may also comprise comparing the second radio bearer setup information with the mobile terminal's receiving capability.

In another aspect, a UTRAN performs a counting process for the second service associated with the second radio bearer based on information received from the mobile terminal. The counting process is compensated when the mobile terminal informs the UTRAN of the service the mobile terminal is not able to receive.

In another embodiment of the invention, a method for receiving a service in a mobile terminal in a wireless communication system comprises subscribing to a plurality of services, prioritizing between the plurality of services, transmitting priority information to a core network, and transmitting the priority information from the core network to a UTRAN, wherein the UTRAN performs a counting process using the priority information when each of the plurality of services is started or in progress.

Transmitting priority information to the core network comprises transmitting an identifier of each service in an arranged order according to the priority of the service. Alternatively, transmitting priority information to the core network may comprise appending a priority value of each service to an identifier of each service, and transmitting the identifier of each service to the core network.

According to one aspect of the present invention, the UTRAN determines that the mobile terminal will receive the services in the order from the highest priority service to the lowest priority service as determined by the mobile terminal.

According to another aspect of the present invention, the method comprises transmitting mobile terminal receiving capability information to the core network and transmitting the mobile terminal receiving capability information from the core network to the UTRAN, wherein the UTRAN performs a counting process using the mobile terminal receiving capability information when each of the plurality of services is started or in progress. In one aspect, the UTRAN determines what services the mobile terminal will receive according to a limitation in the mobile terminal's receiving capability.

In another embodiment of the invention, a method for receiving a service in a mobile terminal in a wireless communication system comprises subscribing to a plurality of services, prioritizing between the plurality of services, and transmitting priority information to a UTRAN, wherein the UTRAN performs a counting process using the priority information when each of the plurality of services is started or in progress.

Transmitting priority information to the UTRAN comprises transmitting an identifier of each service in an arranged order according to the priority of the service. Alternatively, transmitting priority information to the UTRAN comprises appending a priority value of each service to an identifier of each service, and transmitting the identifier of each service to the UTRAN.

According to one aspect of the present invention, the UTRAN determines that the mobile terminal will receive the services in the order from the highest priority service to the lowest priority service as determined by the mobile terminal.

According to another aspect of the present invention, the method comprises transmitting mobile terminal receiving capability information to the UTRAN, wherein the UTRAN performs a counting process using the mobile terminal receiving capability information when each of the plurality of services is started or in progress. In one aspect, the UTRAN determines what services the mobile terminal will receive according to a limitation in the mobile terminal's receiving capability.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

In accordance with a first embodiment of the invention, a radio system comprises a cell for providing a plurality of MBMS services, the cell including a mobile terminal or UE 10 and a UTRAN 100. The terminal 10 is capable of subscribing to a plurality of MBMS services and may transmit data to the UTRAN 100. Preferably, the data which the terminal 10 transmits comprises information regarding the MBMS services the terminal is receiving or expects to receive. The UTRAN 100 manages radio resources based on the information received from the terminal 10.

Particularly, the terminal 10 transmits data to the UTRAN 100 according to the following situation. The terminal 10, currently receiving specific MBMS services, receives an MBMS notification message from the UTRAN 100 with respect to another MBMS service the terminal 10 has subscribed to. After receiving radio bearer establishment information for the other MBMS service, the terminal 10 compares the information received with its own receiving capability. When the terminal 10 determines that it cannot receive all the MBMS services it has subscribed to that a cell transmits, the terminal 10 informs the UTRAN 100 of the MBMS services it expects to receive among all the services it has subscribed to.

Moreover, the terminal 10 may also transmit data to the UTRAN 100 according to the following situation. While the terminal 10 is receiving specific MBMS services in an RRC connected state, radio bearer establishment information for any of the MBMS services the terminal 10 is receiving may change. The terminal 10 then compares the changed radio bearer establishment information with its receiving capability. When the terminal 10 determines that it cannot receive all the MBMS services it has subscribed to that a cell transmits, the terminal 10 informs the UTRAN 100 of the MBMS services it expects to receive among all the services it has subscribed to.

The terminal 10 further transmits data to the UTRAN 100 according to the following situation. While the terminal 10 is in the RRC connected state, the terminal may selectively receive MBMS services it has subscribed to according to its receiving capability. Changes in received MBMS services can result from a user selectively receiving services according to his or her preference. When a change occurs according to the user's selection, the terminal 10 informs the UTRAN 100 of the MBMS services it expects to receive among all the services it has subscribed to.

MBMS-related information the terminal 10 transmits to the UTRAN 100 may include an MBMS service identifier. The service identifier informs the UTRAN 100 of which service each terminal 10 expects to receive. The terminal 10 can further inform the UTRAN 100 of its MBMS service receiving capability as well as information regarding a combination of MBMS services the terminal 10 can receive in each RRC state. For example, if the terminal is in a CELL_DCH state, the terminal 10 informs the UTRAN 100 whether MBMS services transmitted through a point-to-multipoint radio bearer (RB) can be received. If the terminal is in a CELL_FACH state, the terminal 10 informs the UTRAN 100 of the number of different SCCPCHs provided through which simultaneously transmitted MBMS services may be received. The UTRAN 100 uses the information to check which subscribed MBMS services are received or not received by the terminal 10, if the services are transmitted in a cell.

The UTRAN 100 performs a counting process for each MBMS service transmitted from a cell based on the MBMS-related information received from the terminal 10. When data is transmitted from the terminal 10 to the UTRAN 100, the UTRAN 100 receives MBMS service reception information from the terminal 10 in the RRC connected state. If the MBMS service which the terminal 10 has subscribed to, and which the cell is transmitting or is going to transmit, is not included among the MBMS service reception information transmitted by the terminal 10, the UTRAN 100 excludes the terminal 10 from the number of terminals, or a list of terminals, which desire to receive the MBMS service. The UTRAN 100 then updates the number of terminals which desire to receive the MBMS service and compares the number with a threshold value. If required, the UTRAN 100 re-establishes a radio bearer for the MBMS service.

The UTRAN 100 can further manage a terminal 10, wherein the terminal is in the RRC connected state and subscribed to a specific MBMS service but cannot receive the specific service. In this case, the UTRAN 100 manages the terminal using a list comprising of terminals which cannot receive or do not want to receive the MBMS service.

In accordance with a second embodiment of the invention, a radio system comprises a cell for providing a plurality of MBMS services, the cell including a mobile terminal or UE 10 and a UTRAN 100. The terminal 10 is capable of subscribing to a plurality of MBMS services and may transmit data to the UTRAN 100. Preferably, the data which the terminal 10 transmits comprises information regarding the MBMS services the terminal cannot receive or does not want to receive. The UTRAN 100 manages radio resources based on the information received from the terminal 10.

In contrast to the first embodiment, the terminal 10 does not inform the UTRAN 100 of an MBMS service the terminal is able to receive or is going to receive among the MBMS services subscribed to by the terminal and transmitted from the cell. Rather, the terminal 10 informs the UTRAN 100 of MBMS services the terminal 10 cannot receive or will not receive among the MBMS services subscribed to by the terminal and transmitted by the cell. In this method, the UTRAN 100 is directly informed of the list of MBMS services not received by the terminal 10 when performing the counting process.

Figure 4:
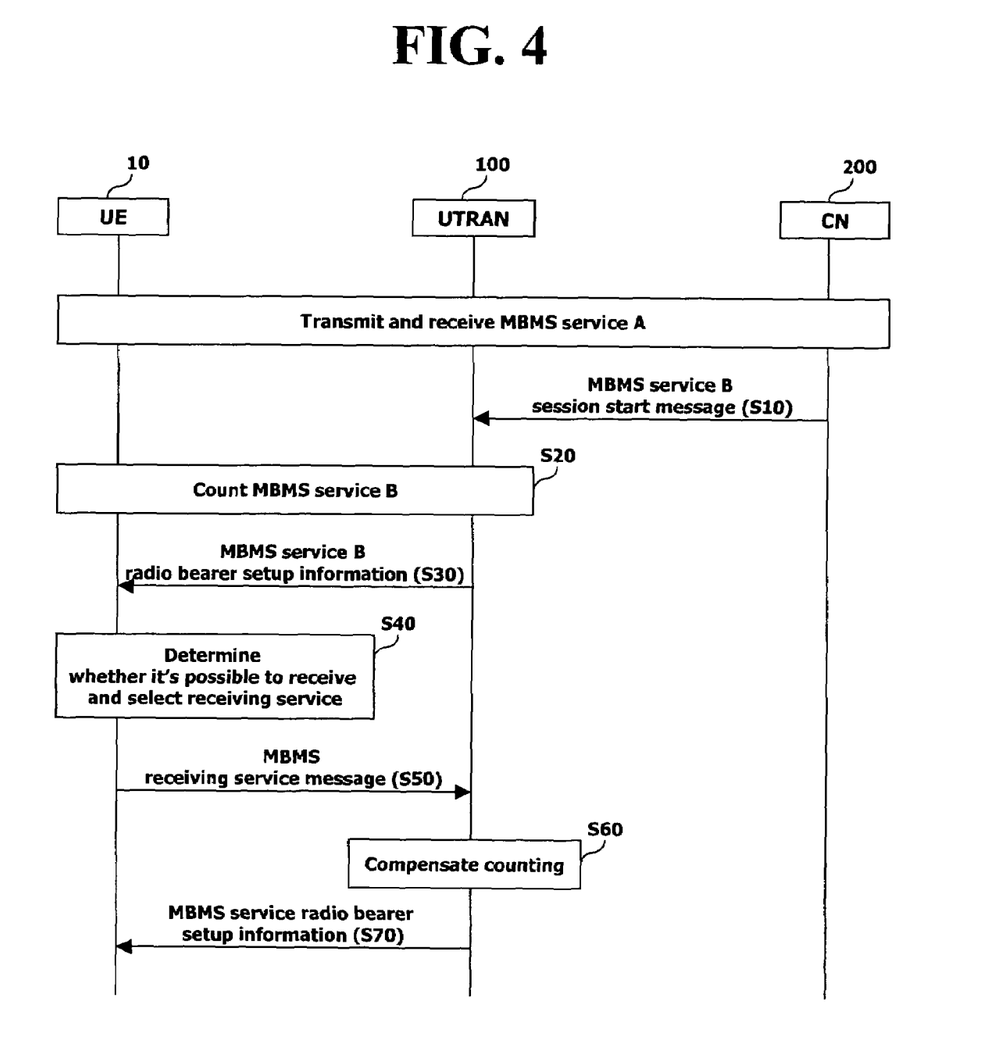
FIG. 4 is a diagram showing operations between a terminal and a network in accordance with an embodiment of invention.

Referring to FIG. 4, an operation between the terminal 10 and the UTRAN 100 in accordance with the first and second embodiments is shown. A session for an MBMS service A is in progress in a cell. During the session for the MBMS service A, the UTRAN 100 transmits MBMS service data to the terminal 10. The terminal 10 according to the first and second embodiment receives the MBMS service A in an RRC connected state. The terminal 10 is also subscribed to an MBMS service B.

When a session start message for the MBMS service B arrives from the core network 200 (S10), the UTRAN 100 performs a counting process for the MBMS service B (S20). Based on the result of the counting process, the UTRAN 100 informs the terminal 10 of radio bearer establishment information with respect to the MBMS service B (S30).

The terminal 10, which has subscribed to both the MBMS service A and the MBMS service B, determines whether it can receive both the MBMS service A and the MBMS service B based on the radio bearer establishment information of each MBMS service and the terminal's receiving capability. If there is a service which the terminal can not receive among the subscribed services, the terminal 10 determines which of the MBMS services to receive (S40). The terminal then informs the UTRAN 100 of a list of MBMS services the terminal expects to receive (S50) based on the determination made in step S40. Alternatively, the terminal 10 may inform the UTRAN 100 of a list of MBMS services the terminal 10 cannot receive. The terminal 10 can further inform the UTRAN 100 of both lists.

In the case where an MBMS service is subscribed to by the terminal 10 but can not receive it, the UTRAN 100 performs the counting process based on the information received from the terminal 10 (S60). That is, the UTRAN 100 excludes the terminal from the number of terminals, or a list thereof, which expect to receive the corresponding MBMS service. The UTRAN 100 then compares the result of the counting process (S60) for each MBMS service with a threshold value. If required, the UTRAN 100 re-establishes a radio bearer, and thereafter informs the terminal 10 of the changed information (S70).

In accordance with a third embodiment of the invention, a radio system comprises a cell for providing a plurality of MBMS services, the cell including a mobile terminal or UE 10 and a UTRAN 100. The terminal 10 is capable of subscribing to a plurality of MBMS services and prioritizing between the subscribed MBMS services. Once priority amongst the services is determined, the terminal 10 transmits the priority information to the core network (CN) 200. The UTRAN 100 performs a counting process based on the priority information received from the terminal 10.

When the terminal 10 subscribes to certain MBMS services, the terminal prioritizes between the subscribed MBMS services and informs the system of the priority information. The priority information is stored in the CN 200. When the terminal forms a signaling connection with an SGSN, the UTRAN 100 receives the priority information from the CN 200. Thereafter, the UTRAN 100 uses the priority information during the counting process when each MBMS service is started or in progress.

For the terminal 10 in the RRC connected state, the UTRAN 100 can therefore be informed of the terminal's service receiving capability and the terminal's prioritized preferences among the MBMS services subscribed to by the terminal. Thus, if a plurality of services among the subscribed MBMS services are simultaneously in progress, the UTRAN 100 determines that the terminal 10 will receive the receivable MBMS services in the order from the highest priority service to the lowest priority service as determined by the terminal 10. The UTRAN 100 further determines what MBMS services the terminal will receive according to a limitation in the terminal's receiving capability.

If the terminal is determined to receive the MBMS service, the UTRAN 100 includes the terminal in the number of terminals desiring to receive the service during the counting process. After performing the counting process, if required, the UTRAN 100 re-establishes a radio bearer and informs the terminals 10 of the changed information.

In accordance with a fourth embodiment of the invention, a radio system comprises a cell for providing a plurality of MBMS services, the cell including a mobile terminal or UE 10 and a UTRAN 100. The terminal 10 is capable of subscribing to a plurality of MBMS services and prioritizing between the subscribed MBMS services. Once priority amongst the services is determined, the terminal 10 transmits the priority information to the UTRAN 100. The UTRAN 100 performs a counting process based on the priority information received from the terminal 10.

In contrast to the third embodiment, the terminal 10 does not inform the CN 200 of the priority between the MBMS services the terminal 10 has subscribed to. Rather, the terminal 10 directly informs the UTRAN 100 when the terminal is in the RRC connected state. Using this method, unnecessary message exchanges between the UTRAN 100 and the CN 200 is reduced. Furthermore, the terminal 10 can inform the UTRAN 100 of its priority information more quickly.

Particularly, when the terminal 10 goes into the RRC connected state, the terminal 10 informs the UTRAN 100 of the priority amongst the MBMS services the terminal has subscribed to. Also, when the terminal 10 receives an MBMS message for MBMS services the terminal has subscribed to, the terminal 10 informs the UTRAN 100 of the priority amongst the MBMS services.

Furthermore, whenever the terminal re-establishes the priority of each MBMS service in the RRC connected state, the terminal informs the UTRAN 100 of the re-established priority information. Thus, in the case where the terminal 10 expects to receive other MBMS services transmitted from a cell while receiving a certain MBMS service, the terminal 10 informs the UTRAN 100 of the priority information for each MBMS service subscribed to so that the UTRAN 100 knows that the terminal 10 expects to receive or is receiving other MBMS services.

When informing the UTRAN 100 of the priority of each MBMS service, the terminal 10 transmits to the UTRAN 100 an identifier of each service in an arranged order according to the priority of the service. Alternatively, the terminal 10 may inform the UTRAN 100 of the priority of each MBMS service by appending a priority value of each service when transmitting the identifier of each service.

Furthermore, when informing the UTRAN 100 of the priority of each MBMS service, the terminal 10 may transmit priority information regarding all the services the terminal has subscribed to or transmit priority information regarding only those MBMS services which are in the process of being transmitted from a cell and subscribed to by the terminal.

In accordance with a fifth embodiment of the invention, operations of the terminal 10 and the UTRAN 100 will be explained when a type of radio bearer (RB) having been established for a particular MBMS service should be changed.

If the UTRAN 100 changes the establishment of an RB having been established for a particular MBMS service or sends establishment information of a new RB to the terminal, the terminal 10 checks the establishment information of the new RB received from the UTRAN 100. Accordingly, a situation may occur where the terminal 10 may not receive a service it expects to receive because of the changed RB. If so, the terminal 10, according to the present invention, notifies the UTRAN 100 that it may not receive the expected service.

Particularly, when the terminal 10 receives a plurality of MBMS services through a point-to-multipoint RB in an RRC connected state, the terminal may receive a command from the UTRAN 100 to establish a point-to-point RB with respect to one or more services among the MBMS services subscribed to by the terminal 10. The terminal 10 then checks the establishment information of the point-to-point RB. If the terminal 10 is not able to receive MBMS services having higher priority than those MBMS services to be received through the point-to-point RB, established by the command of the UTRAN 100, the terminal 10 informs the UTRAN 100 that it cannot accept the establishment of the point-to-point RB. The terminal 10 may further inform the UTRAN 100 which particular services make it impossible to establish the point-to-point RB.

Furthermore, when the terminal 10 receives a plurality of MBMS services through a point-to-point RB in an RRC connected state, the terminal may receive a command from the UTRAN 100 to establish a point-to-multipoint RB with respect to one or more services among the MBMS services subscribed to by the terminal 10. The terminal 10 then checks the establishment information of the point-to-multipoint RB.

If the terminal 10 is not able to receive MBMS services having higher priority than those MBMS services to be received through the point-to-multipoint RB, established by the command of the UTRAN 100, the terminal 10 informs the UTRAN 100 that it cannot accept the establishment of the point-to-multipoint RB. The terminal 10 may further inform the UTRAN 100 which particular services make it impossible to establish the point-to-multipoint RB.

Moreover, if the UTRAN 100 receives a message that the terminal 10 can not follow its command to establish an RB for particular MBMS services, the UTRAN 100 re-adjusts whether the terminal 10 should be included in a list of terminals desiring to receive a particular MBMS service. If required, the UTRAN 100 adjusts the RB to be established in order for the terminal 10 to receive the MBMS services having higher priority.

Figure 5:
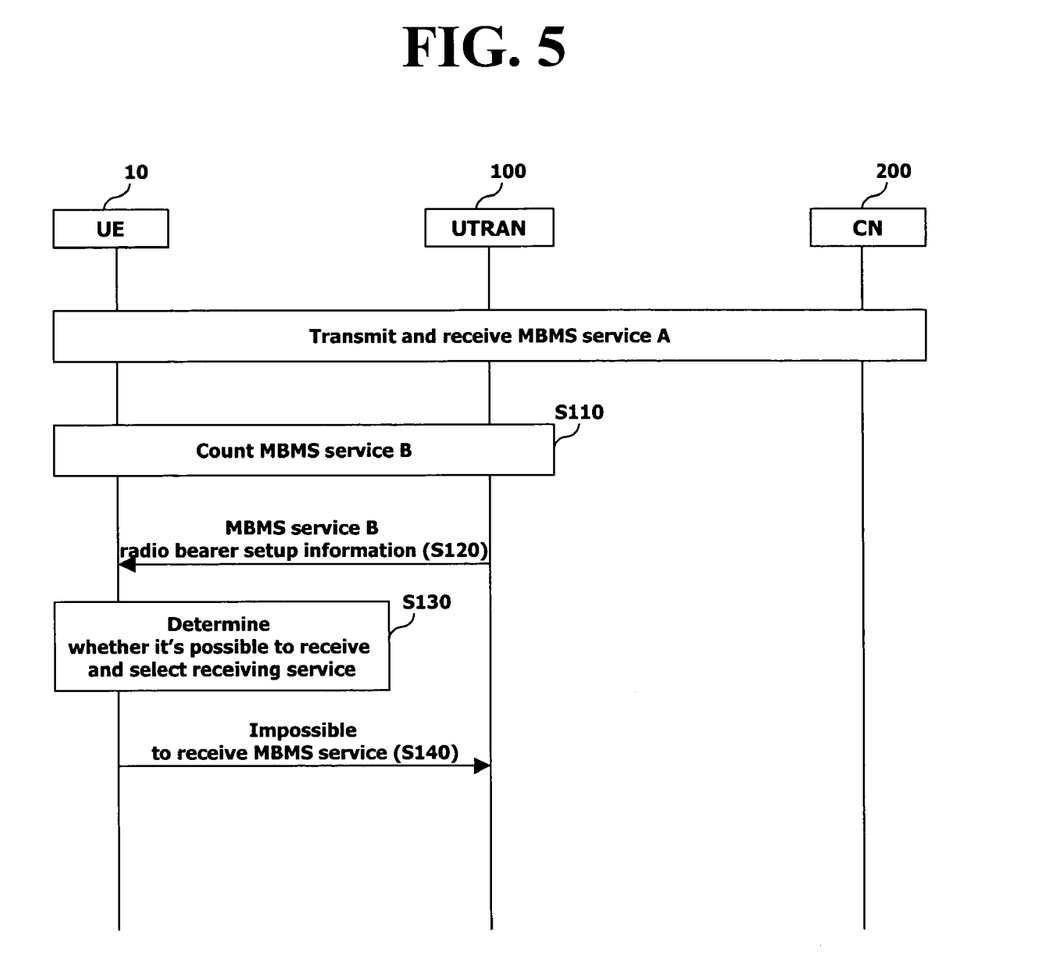
FIG. 5 is a diagram showing an operation between a terminal and a network wherein a type of radio bearer having been established for a particular service is to be changed in accordance with one embodiment of the invention.

Referring to FIG. 5, an operation of the terminal 10 and the UTRAN 100 is shown when a type of RB having been established for a specific MBMS service is to be changed during a session. In FIG. 5, it is assumed that the terminal receives an MBMS service A and an MBMS service B. Further, the MBMS service A has a higher priority than the MBMS service B. It is also assumed that the terminal 10 is in the RRC connected state.

The UTRAN 100 performs a counting process for the MBMS service B newly received (S110). Then, according to the result of the counting process performed, if the type of RB having been established for the MBMS service B is determined to be changed, the UTRAN 100 informs the terminal 10 of the new establishment information for the RB (S120).

Once receiving the establishment information from the UTRAN 100, the terminal 10 checks the RB establishment information of each MBMS service using the received information. The terminal then checks whether the MBMS service A having the higher priority can also be received (S130). If it is determined according to the checked result that the MBMS service A can not be received, the terminal informs the UTRAN 100 that the MBMS service A can not be received (S140).

As aforementioned, the UTRAN is supported to more precisely count the number of terminals expecting to receive MBMS services, thereby reducing radio resources allocated to the terminal and the UTRAN. As a result, terminals receive higher-quality MBMS services.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for receiving a plurality of Multimedia Broadcast/Multicast Service (MBMS) services in a mobile terminal from a network in a wireless communication system, the method comprising:
    establishing a point-to-multipoint radio bearer (RB) and receiving one or more MBMS services associated with the established point-to-multipoint radio bearer;
    receiving point-to-point radio bearer setup information from the network to establish a point-to-point radio bearer for receiving one or more MBMS services associated with the point-to-point radio bearer;
    prioritizing the one or more MBMS services associated with the point-to-multipoint radio bearer and the one or more MBMS services associated with the point-to-point radio bearer;
    determining whether the mobile terminal is able to receive all MBMS services associated with the point-to-multipoint radio bearer;
    terminating ongoing reception of a lower priority MBMS service associated with the point-to-multipoint radio bearer and starting to receive a highest priority MBMS service associated with the point-to-multipoint radio bearer if the mobile terminal is not able to receive all MBMS services associated with the point-to-multipoint radio bearer; and
    rejecting setup of the point-to-point radio bearer when the point-to-point radio bearer is being established or transmitting a request for releasing the point-to-point radio bearer when the point-to-point radio bearer already exists if the mobile terminal is not able to receive a higher priority MBMS service because reception of the point-to-point radio bearer of the lower priority MBMS service is blocking or inhibiting reception of the point-to-multipoint radio bearer of the higher priority MBMS service,
    wherein the mobile terminal requests the network to terminate the one or more MBMS services using an MBMS modification request message if reception of the prioritized one or more MBMS services is blocked or inhibited by the one or more MBMS services provided via the point-to-point radio bearer, and
    wherein the prioritized one or more MBMS services are transmitted to the network with an identifier for each MBMS service in an order arranged according to priority of each of the one or more MBMS services.

2. The method of claim 1, wherein the network does not try to re-establish the set up of the point-to-point radio bearer for the lower priority MBMS service and session after the setup of point-to-point radio bearer is rejected.

3. The method of claim 1, wherein when the request for releasing the point-to-point radio bearer is received by the network, the network releases the point-to-point radio bearer.

4. The method of claim 1, wherein the mobile terminal requests upper layers to prioritize the MBMS services and initiate release of non-prioritized MBMS services that interrupt reception of the prioritized MBMS services if the mobile terminal is not able to receive all MBMS services associated with the point-to-multipoint radio bearer.

5. The method of claim 1, wherein the MBMS modification request message includes at least one of a prioritized MBMS service identity and point-to-point radio bearers used for corresponding MBMS services.

6. The method of claim 1, wherein the mobile terminal is in a radio resource control (RRC) connected mode.

7. The method of claim 1, further comprising:
    informing the network of the prioritized one or more MBMS services.

8. The method of claim 1, wherein determining whether the mobile terminal is able to receive all MBMS services associated with the point-to-multipoint radio bearer is performed by comparing the point-to-point radio bearer setup information with the mobile terminal's receiving capability.

9. The method of claim 1, wherein the network performs a counting process for the one or more MBMS services associated with the point-to-point radio bearer based on prioritized information received from the mobile terminal.

10. The method of claim 9, wherein the counting process is compensated when the mobile terminal informs the network of the one or more MBMS services that are not receivable by the mobile terminal.

11. The method of claim 1, wherein a priority value of each MBMS service is appended to the identifier for each MBMS service.

12. The method of claim 1, wherein the network determines which services will be received by the mobile terminal according to a limitation in receiving capability information of the mobile terminal.

13. A method for transmitting a plurality of Multimedia Broadoast/Multicast Service (MBMS) services from a network to a mobile terminal in a wireless communication system, the method comprising:
    establishing a point-to-multipoint radio bearer (RB) and transmitting one or more MBMS services associated with the established point-to-multipoint radio bearer;
    transmitting point-to-point radio bearer setup information to the mobile terminal to establish a point-to-point radio bearer for transmitting one or more MBMS services associated with the point-to-point radio bearer;
    starting transmission of a highest priority MBMS service associated with the point-to-multipoint radio bearer if the mobile terminal is not able to receive all MBMS services associated with the point-to-multipoint radio bearer, wherein the highest priority MBMS service is determined by prioritizing the one or more MBMS services associated with the point-to-multipoint radio bearer and point-to-point radio bearer;
    rejecting setup of the point-to-point radio bearer when the point-to-point radio bearer is being established or receiving a request for releasing the point-to-point radio bearer from the mobile terminal when the point-to-point radio bearer already exists if the mobile terminal is not able to receive a higher priority MBMS service because reception of the point-to-point radio bearer of a lower priority MBMS service is blocking or inhibiting reception of the point-to-multipoint radio bearer of the higher priority MBMS service; and receiving an MBMS modification request message for terminating the one or more MBMS services if reception of the prioritized one or more MBMS services by the mobile terminal is blocked or inhibited by the one or more MBMS services provided via the point-to-point radio bearer, wherein the prioritized one or more MBMS services are transmitted to the network with an identifier for each MBMS service in an order arranged according to priority of each of the one or more MBMS services.

14. The method of claim 13, wherein reestablishment of the point-to-point radio bearer for the lower priority MBMS service and session is not performed after the setup of the point-to-point radio bearer is rejected.

15. The method of claim 13, further comprising:
releasing the point-to-point radio bearer upon receiving the request for releasing the point-to-point radio bearer.

16. The method of claim 13, wherein the MBMS modification request message includes at least one of a prioritized MBMS service identity and point-to-point radio bearers used for corresponding MBMS services.

17. The method of claim 13, wherein the mobile terminal is in a radio resource control (RRC) connected mode.

18. The method of claim 13, further comprising:
performing a counting process for the one of more MBMS services associated with the point-to-point radio bearer.

19. An apparatus for receiving a plurality of Multimedia Broadcast/Multicast Service (MBMS) services in a mobile terminal from a network in a wireless communication system, the apparatus comprising:
a receiver configured to establish a point-to-multipoint radio bearer (RB) and receiving one or more MBMS services associated with the established point-to-multipoint radio bearer, the receiver further receiving point-to-point radio bearer setup information from the network to establish a point-to-point radio bearer receiving one or more MBMS services associated with the point-to-point radio bearer; and
a processor configured to prioritize the one or more MBMS services associated with the point-to-multipoint radio bearer and the one or more MBMS services associated with the point-to-point radio bearer and determining whether the mobile terminal is able to receive all MBMS services associated with the point-to-multipoint radio bearer,
wherein ongoing reception of a lower priority MBMS service associated with the point-to-multipoint radio bearer is terminated and a highest priority MBMS service associated with the point-to-multipoint radio bearer starts to be received if the mobile terminal is not able to receive all MBMS services associated with the point-to-multipoint radio bearer,
wherein if the mobile terminal is not able to receive a higher priority MBMS service because reception of the point-to-point radio bearer of the lower priority MBMS service is blocking or inhibiting the reception of the point-to-multipoint radio bearer of the higher priority MBMS service, setup of the point-to-point radio bearer is rejected when the point-to-point radio bearer is being established or a request for releasing the point-to-point radio bearer is transmitted when the point-to-point radio bearer already exists,
wherein the mobile terminal requests the network to terminate the one or more MBMS services using a MBMS modification request message if reception of the prioritized one or more MBMS services is blocked or inhibited by the one or more MBMS services provided via the point-to-point radio bearer, and
wherein the prioritized one or more MBMS services are transmitted to the network with an identifier for each MBMS service in an order arranged according to priority of each of the one or more MBMS services.

20. A network for transmitting a plurality of Multimedia Broadcast/Multicast Service (MBMS) services from a network to a mobile terminal in a wireless communication system, the network comprising:
a transmitter configured to:
establish a point-to-multipoint radio bearer (RB) and transmitting one or more MBMS services associated with the established point-to-multipoint radio bearer;
transmit point-to-point radio bearer setup information to the mobile terminal to establish a point-to-point radio bearer for transmitting one or more MBMS services associated with the point-to-point radio bearer; and
start transmission of a highest priority MBMS service associated with the point-to-multipoint radio bearer if the mobile terminal is not able to receive all MBMS services associated with the point-to-multipoint radio bearer,
wherein the highest priority MBMS service is determined by prioritizing the one or more MBMS services associated with the point-to-multipoint radio bearer and point-to-point radio bearer,
wherein if the mobile terminal is not able to receive a higher priority MBMS service because reception of the point-to-point radio bearer of a lower priority MBMS service is blocking or inhibiting the reception of the point-to-multipoint radio bearer of the higher priority MBMS service, setup of the point-to-point radio bearer is rejected when the point-to-point radio bearer is being established or a request for releasing the point-to-point radio bearer is transmitted when the point-to-point radio bearer already exists,
wherein the mobile terminal requests the network to terminate the one or more MBMS services using a MBMS modification request message if reception of the prioritized one or more MBMS services is blocked or inhibited by the one or more MBMS services provided via the point-to-point radio bearer, and
wherein the prioritized one or more MBMS services are transmitted to the network with an identifier for each MBMS service in an order arranged according to priority of each of the one or more MBMS services.

* * * * *